Sept. 24, 1940.  C. F. GEDGE  2,215,664
COMPACT EGG TURNING MECHANISM
Filed Aug. 14, 1939  4 Sheets-Sheet 1
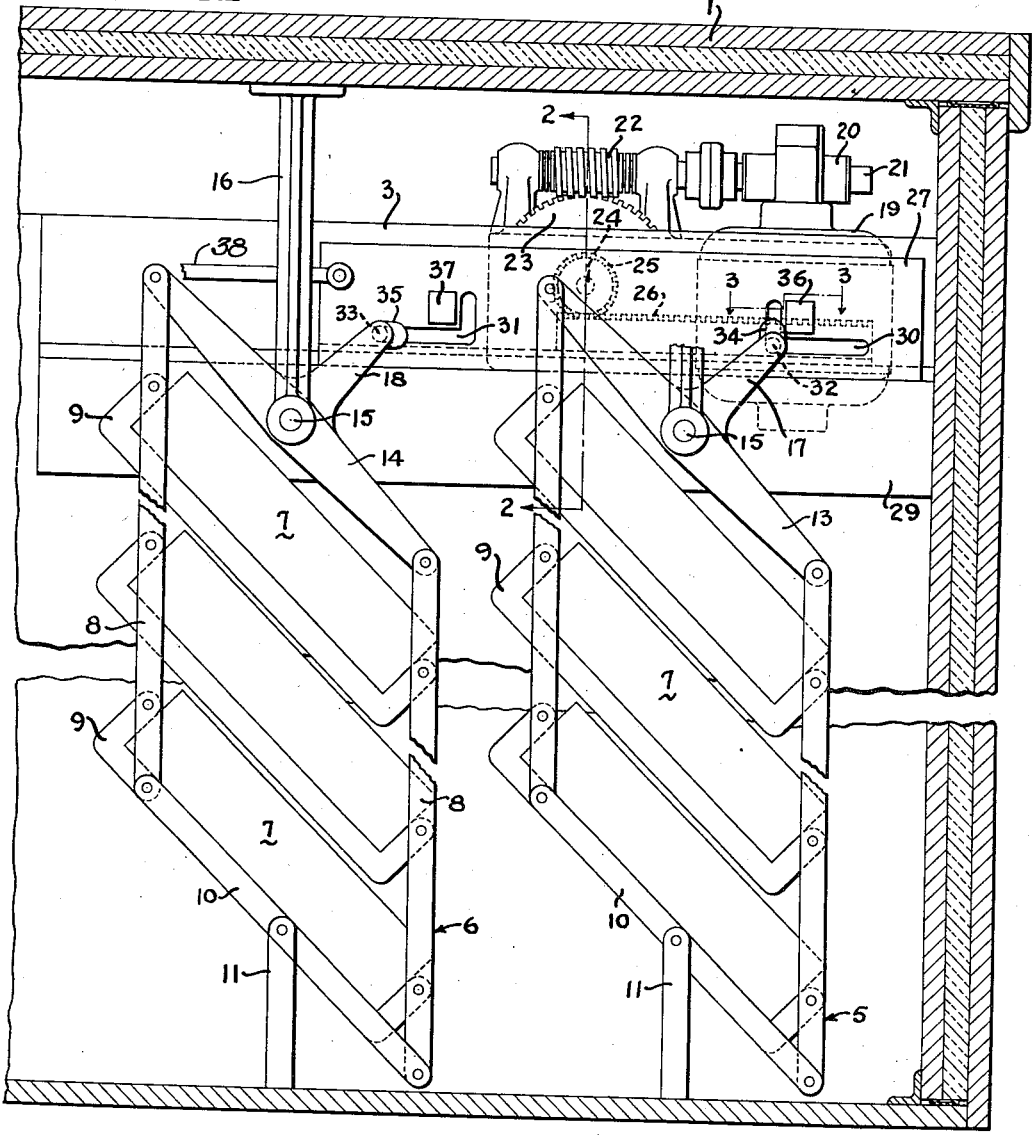
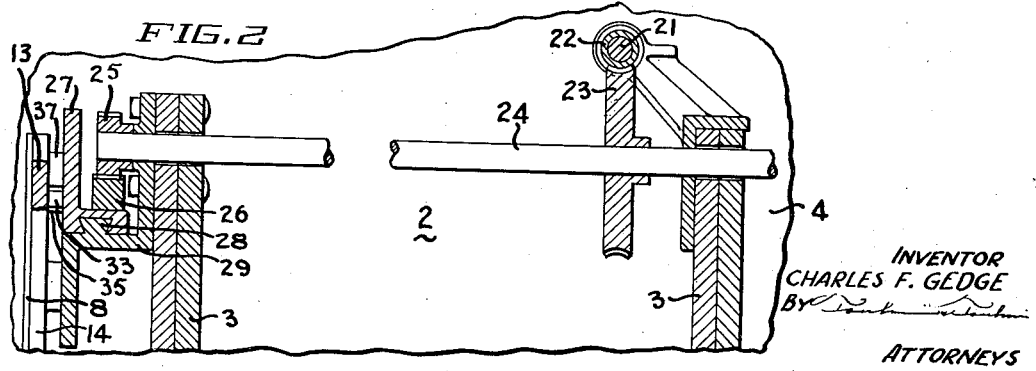
INVENTOR
CHARLES F. GEDGE
By
ATTORNEYS

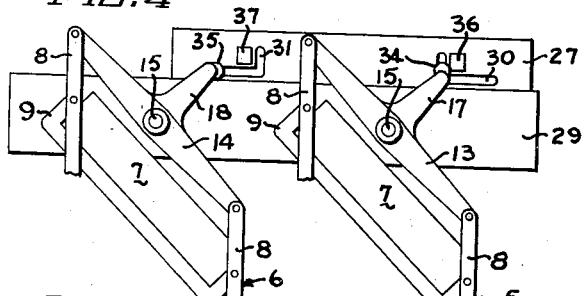
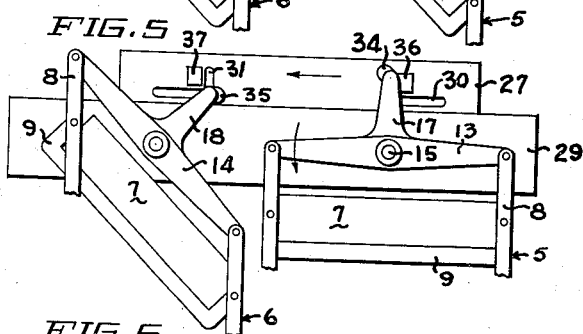
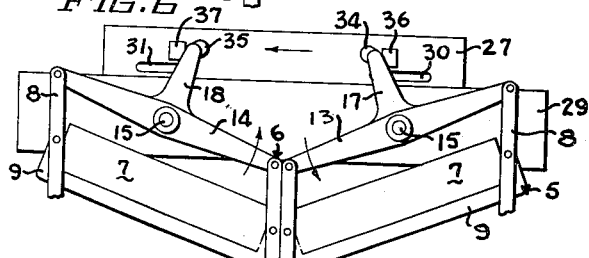
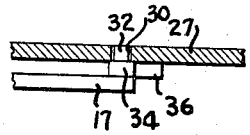
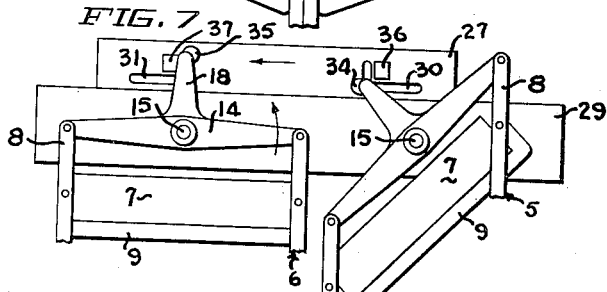
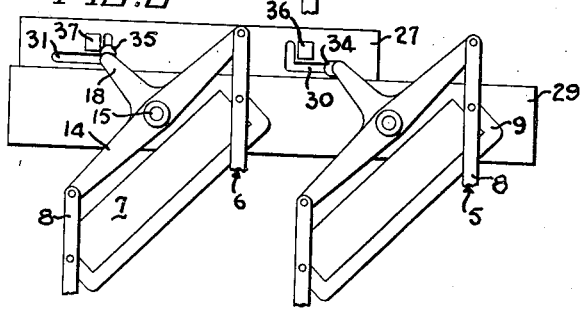

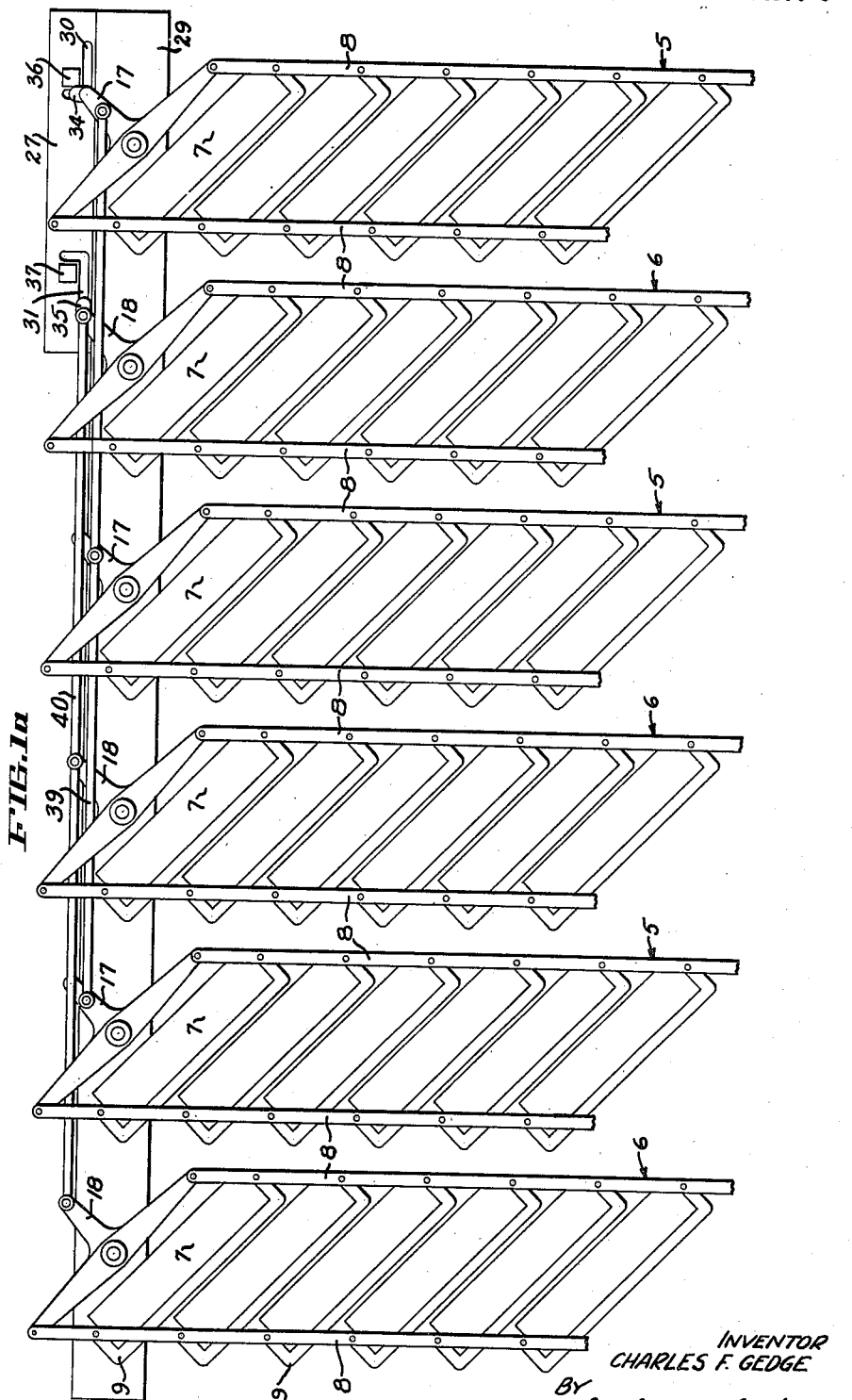

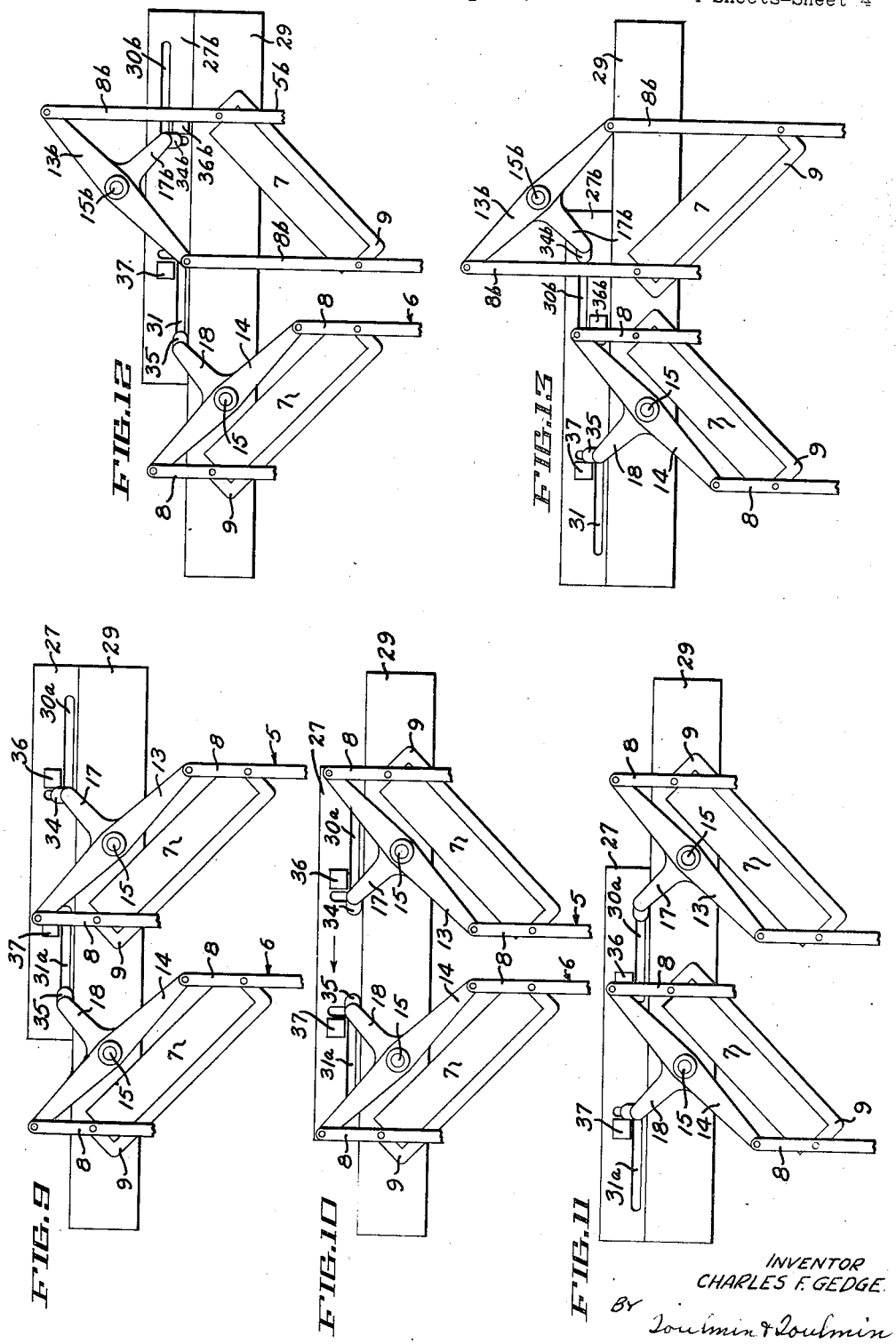

Patented Sept. 24, 1940

2,215,664

UNITED STATES PATENT OFFICE 2,215,664

COMPACT EGG TURNING MECHANISM

Charles F. Gedge, Springfield, Ohio, assignor to The Buckeye Incubator Company, Springfield, Ohio, a corporation of Ohio Application August 14, 1939, Serial No. 290,051

13 Claims. (Cl. 119—44)

This invention relates to mechanism for turning eggs in an incubator and more particularly to such mechanism which permits a more compact arrangement of eggs in the incubator.

The principal object of the present invention is to devise mechanism for turning eggs which increases the egg capacity of the incubator.

Another object is to devise egg turning mechanism wherein adjacent rows of egg trays are turned non-simultaneously whereby the rows of trays may be placed more closely to one another so that the egg capacity of the incubator is increased.

Another object is to utilize for eggs at least a portion of the space heretofore required between adjacent rows of trays to allow the turning arc.

Another object is to devise mechanism whereby alternate vertical rows of egg trays are begun in their turning before the intermediate alternate rows begin in their turning; in a preferred form, the alternate rows are first turned to an approximately horizontal position whereupon the other trays begin their turning, the first trays completing their turning after the second trays have begun to turn and the second trays continuing in their turning until they have attained the same angle as the first trays.

Another object is to improve the air circulation through the trays; with the mechanism of the present invention, the tendency for stratification of air in vertical currents between adjacent rows of trays is to a large extent overcome.

Still other objects will more fully hereinafter appear.

In the accompanying drawings;

Figure 1 is a vertical longitudinal section through an incubator equipped with the turning mechanism of the present invention, showing in elevation a pair of adjacent rows of egg trays.

Figure 1a is a diagrammatic view showing six rows of egg trays, alternate rows of which are interconnected by a rod to operate together, and intermediate rows of which are interconnected by a rod to operate together, a single control mechanism being employed.

Figure 2 is a vertical detailed section on approximately the line 2—2 of Figure 1, looking in the direction of the arrows.

Figure 3 is a detailed horizontal section on the line 3—3 of Figure 1, looking in the direction of the arrows.

Figures 4 to 8 are views showing successive steps in the turning of the trays, Figures 4 and 8 showing the initial and final positions and Figures 5 to 7 showing successive intermediate positions in the turning process.

Figures 9 to 11 are views showing successive steps in the turning of the trays in accordance with a modification by which the trays in one row are tilted completely before the trays in the adjacent row begin their turning.

Figures 12 and 13 are views showing the two opposite final positions of turning of trays by a further modification in which the trays are oppositely inclined, one row being completely tilted before the other row begins its tilting.

Referring to the drawings in detail, reference numeral 1 designates the housing of the incubator having two spaced longitudinal partitions 3 forming a central space 2 and end spaces 4 in which are disposed transversely the setting trays in vertical rows spaced longitudinally. A pair of adjacent tray racks are shown designated generally as 5 and 6, the trays themselves being designated as 7. Tray racks 5 and 6 comprise vertical members 8 at each corner of the trays 7. Members 8 are pivoted to the ends of U-shaped tray receiving members 9, trays 7 being removable only when the racks 5 and 6 are so disposed that the members 9 are horizontal. Vertical members 8 are pivotally attached at their lower ends to a pair of cross-members 10 which are centrally pivoted to transversely spaced uprights 11 extending up from the bottom of incubator body 1.

Connecting vertical members 8 at their top are cross members 13 and 14 which are pivoted to vertical members 8 and each of which is journaled centrally about a transversely extending shaft 15 carried in the lower end of a supporting member 16 fastened securely to the ceiling of the incubator 1. It will be understood that there are two members 13 and 14 for each tray rack shown, only the forward members 13 and 14 being visible in Figs. 1 and 4 to 8. Means for positively tilting the tray rack is provided at only one end (the rear end) of the tray rack. The cross members 13 and 14 which are located inwardly adjacent partition 3 and which are not visible in the drawings being hidden behind the forward members 13 and 14, are provided with an upwardly extending member 17 and 18 respectively. Thus when cross members 13 and 14 are rotated about their pivots 15, vertical members 8 and tray supporting members 9 are moved accordingly. This accomplishes the tilting of the trays 7 from the angle of 45° in the one direction as shown, to an angle of 45° in the other direction. In the mechanism shown, this tilting is accomplished by correspondingly tilting members 17 and 18 attached integrally to the innermost turning members 13 and 14. The trays and tray racks are supported by the depending supporting members 16 and by the upwardly extending supporting members 11.

The tray racks 5 and 6 are disposed with their center lines so close to one another that a striking would occur were it attempted to simultaneously tilt tray rack 5 and tray rack 6. The mechanism of the present invention, to be presently described, prevents such striking action and yet allows the attainment of the advantages attendant upon such close disposition of adjacent egg trays. Among these advantages are a greater egg capacity due to utilization of a portion of the space normally required to permit simultaneous turning of the egg trays and the better air circulation through the egg trays and elimination of vertical air strata by reason of the closeness of adjacent trays. It will be understood that in the normal operation of the incubator air is circulated downwardly through central space 2, thence diverging in two paths beneath partition-like members 3, and passing upwardly through the trays in spaces 4, and converging inwardly over the tops of partitions 3. This general mode of circulation is disclosed in the patent to Smith, No. 1,262,860. The irregular surfaces of the closely adjacent egg trays coupled with the closeness of these trays cause any vertical air currents to be broken up into subsidiary air currents which pass through the egg trays, thereby bringing about more favorable embryonic development.

An electric turning motor 19 is disposed near the top of the incubator in any suitable manner and is provided with a speed reducing box 20 driving a longitudinal shaft 21 upon which is mounted a worm 22 which drives a worm wheel 23 fixedly attached to and driving a transverse shaft 24, the ends of which project through partitions 3 and are provided inwardly of partition 3 with a pinion 25 enmeshing with a longitudinally disposed rack 26. Rack 26 is fixedly attached to a slotted control plate 27 which is longitudinally slidably disposed about a dovetail 28 of an angle plate 29 fixedly attached to partition 3.

Control plate 27 is provided with a control slot 30 which is adapted to control the tilting of tray rack 5, and with a control slot 31 which is similarly adapted to control the tilting of tray rack 6. Slots 30 and 31 are right angle slots having a relatively long horizontal portion and a relatively short vertical portion, these slotted portions being connected to one another to form a continuous right angle slot. The slots 30 and 31 are arranged with their vertical portions adjacent each other, and are of such proportions that the distance between the left hand end of the horizontal portion of slot 31 and the left hand end of the horizontal portion of slot 30 is equal to the distance between pivots 15 of tray racks 5 and 6, while the distance between the right hand ends of the horizontal portions of the slots is likewise equal to this distance between pivot points.

Fixedly attached to or integral with the upper end of extensions 17 and 18 of turning members 13 and 14, and extending inwardly towards partition 3 are pins 32 and 33 respectively. These pins are slidingly received in slots 30 and 31 respectively. Also fixedly attached to the upper end of extensions 17 and 18 of turning members 13 and 14 are cam ears 34 and 35 respectively. Cam ears 34 and 35 are slightly wider than slots 30 and 31 so that they will not enter said slots, these cam ears being disposed between that portion of pins 32 and 33 extending into the slots and extensions 17 and 18. In practice, as indicated in Figure 3, the pins may be integral with the cam ears and the integral pin and cam ear attached to the face of extension 17 in any suitable manner.

Cam ear 34 of turning member 13 for tray rack 5 projects at an angle of 45° relative to the axis of turning member 13 towards that side of turning member 13 which is adjacent tray rack 6. Cam ear 35 for tray rack 6, likewise projects at an angle of 45° relative to the long axis of turning member 14 towards that side of turning member 14 which is adjacent tray rack 5. Cam ears 34 and 35 have straight sides and semicircular ends, the upper-most semicircular end being shown and the lower-most semicircular end being concealed behind extensions 17 and 18. These cam ears are effective to cause the pin on the turning member which is to be turned first to enter the vertical portion of its slot.

For co-acting with the cam ears 34 and 35, square members 36 and 37 are disposed adjacent the inside right angle portion of slots 30 and 31 respectively. These square members 36 and 37 are fixedly mounted in any suitable manner or integral with control plate 27, projecting from the face thereof towards the egg trays. These members 36 and 37 are preferably slightly thinner than cam ears 34 and 35, so that there is no possibility of members 36 and 37 engaging with projections 17 and 18 of the turning members 13 and 14. These members 36 and 37 are disposed with their effective surfaces adjacent slots 30 and 31 disposed from slots 30 and 31 a distance such that cam ears 34 and 35 are free to slide along the inward and downward faces of members 36 and 37.

Referring to Figures 4 to 8, Figure 4 shows the tray racks 5 and 6 both tilted to the same angle, in what may be considered for purposes of description the initial position, control plate 27 being moved rightwardly as far as it can go. In order to initiate tilting of the trays so that they are both tilted at the same angle but in the opposite direction, as in Figure 8, control plate 27 is moved leftwardly. As plate 27 begins its movement leftwardly, cam ear 34 cooperates with the vertical inward surface of member 36, to cause pin 32 to rise in the vertical portion of slot 30, thus causing pin 32 to move in an arc about the pivot point of turning member 13 and causing turning member 13 and tray rack 5 to begin tilting. At the same time, pin 33 of turning member 14 slides freely along the horizontal portion of slot 31, thus causing no tilting of turning member 14 or of tray rack 6. When pin 32 reaches the top of the vertical portion of slot 30, pin 33 will have reached the rightward end of the horizontal portion of slot 31 and will be about to rise in the vertical portion of slot 31. At this point, the parts will have assumed the position of Figure 5, tray rack 5 being approximately horizontal.

As control plate 27 continues in its leftward movement from the position of Figure 5, pin 32 begins its downward movement in the vertical portion of slot 30, while pin 33 begins its upward movement in the vertical portion of slot 31. This causes the left hand side of tray rack 5 to move downwardly while the right hand side of tray rack 6 is caused simultaneously to move upwardly, until the adjacent ends of racks 5 and 6 are in the position of passing one another as in Figure 6, wherein pins 32 and 33 are intermediate of the vertical portions of slots 30 and 31 respectively.

As control plate 27 is moved leftwardly from the position of Figure 6, pin 32 continues downwardly in the vertical portion of slot 30 until it reaches the bottom of this vertical portion, whereupon tray rack 5 will have attained its final tilted position. At the same time, pin 33 will have moved upwardly in the vertical portion of slot 31 until it has reached the upper limit of its travel, whereupon tray rack 6 will be horizontal. The parts are now in the position of Figure 7. Continuing the movement of control plate 27 to the left of its position in Figure 7, pin 32 is slidingly engaged by the horizontal portion of slot 30 and consequently does not move turning member 13, but locks it and tray rack 5 against tilting. Simultaneously, pin 33 moves downwardly in the vertical portion of slot 31 until it strikes the bottom of this vertical portion, whereupon it will have tilted tray rack 6 to its final position, the parts now being as in Figure 8.

To bring the trays from the position of Figure 8 to that of Figure 4, motor 19 will be operated in the opposite direction, whereupon control plate 27 will be moved rightwardly, tray rack 6 beginning its movement before tray rack 5, and the tilting proceeding as before but in the opposite order.

Cam ears 34 and 35 are necessary only at the start of the turning and then only for the tray having its pin next to the vertical portion of its slot to cause the pin on such a tray to enter the vertical slot instead of moving along the horizontal slot. For example, cam ear 34 is necessary in Figure 4 at the outset but becomes substantially ineffective after pin 32 has begun its upward travel and cam ear 35 is substantially ineffective during tilting from Figure 4 to Figure 8. Similarly, cam ear 35 is effective during the tilting from Figure 8 back to Figure 4 only at the outset when it causes pin 33 to enter the vertical portion of slot 31. Cam ears 34 and 35 are useful in the other positions of tilting to impart tightness and smoothness to the mechanism but are not absolutely essential during such other positions.

It will be understood that while the invention has been illustrated with reference to only a pair of adjacent tray racks, suitable means will be provided for controlling the alternate tray racks in a row of tray racks so that they will turn in accordance with the turning of tray rack 5, for example, whereas the remaining intermediate tray racks between these alternate tray racks will be connected so as to tilt simultaneously with tray rack 6. This may be accomplished either by extending control plate 27 throughout the row of tray racks, and providing a pair of slots and control devices like that illustrated for each pair of adjacent racks, by providing a control plate 27 for each pair of racks and connecting them as by the pivoted link 38 a portion of which is shown in Fig. 1, or as is illustrated in Fig. 1a, by providing the single control mechanism shown for a single pair of tray racks, and connecting the alternate racks in the row of racks to operate simultaneously with the racks 5 and 6 illustrated by any suitable mechanism such as the links 39 and 40 extending pivotally from control members 17 and 18 to operative pivotal engagement with the control members for the other tray racks. In this way, all of the vertical rows of egg trays in the incubator will be operated in accordance with the principles of the present invention, according to which alternate vertical rows of egg trays are first turned to at least a horizontal position before the other trays begin their turning, and in this way the advantages attendant upon non-simultaneous turning of the trays will be attained.

In Figs. 9 to 11 there is portrayed a modified form wherein the length of the horizontal portions of the slots is extended and the location of the slots is changed to cause the first row of trays to tilt completely before the adjacent row begins its tilting. The slots are designated 30a and 31a for tilting tray racks 5 and 6 respectively, the slots being placed considerably closer to one another to bring about this action. In Fig. 9, the parts are shown in an initial position before tilting with both tray racks 5 and 6 inclined similarly. As the tilting plate 27 is moved leftwardly of Fig. 9, the pin 32 on member 17 enters the vertical portion of slot 30a and traverses this slot upwardly and downwardly, causing the parts to assume the position of Fig. 10 in which pin 33 of member 18 has traversed the horizontal portion of slot 31a and in which tray rack 5 is completely tilted but tray rack 6 has not yet begun tilting. Continuing the leftward movement of plate 27, pin 32 on member 17 traverses the horizontal portion of slot 30a, while pin 33 of member 18 goes up and down in the vertical portion of its slot 31a, whereupon the two tray racks 5 and 6 are completely tilted and the parts are in the position of Fig. 11.

In Figs. 12 and 13, a still further modification is shown wherein one row of trays is tilted completely before the adjacent row but the trays are initially and finally inclined in opposite directions. To effect this result, the control member 17b of the tray rack 5b is inverted, the side members 8b of that tray rack are correspondingly lengthened and the slot 30b in plate 27 is correspondingly inverted. The square member 36b is positioned with reference to the slot 30b in the same manner as before. Operation is identical with that just described for Figs. 9 to 11, tray rack 5b being first turned completely upon the leftward movement of control plate 27b in Fig. 12, whereupon tray rack 6 begins its tilting continuing until it is completely tilted and the parts assume the position shown in Fig. 13.

If desired, motor 19 may be replaced by manually operated tilting means such as a crank or hand wheel located on the exterior of the incubator. Means may be provided for automatically operating reversible motor 19 at proper timed intervals and in the proper direction to tilt the trays from one position to the other.

I wish it to be understood that I intend to include as within the invention such modifications as may be necessary to adapt it to varying conditions and uses and as fall within the spirit or the terms of the appended claims.

If desired, supports 16 may be omitted and shafts 15 may be journalled in channels 29. Instead of an angle of 45°, any other acute angle of tilting may be employed. The motor drive may be of a variety of types such as for example a chain or belt drive instead of the gear drive illustrated.

Having thus fully described my invention, what I claim as new and desire to secure by Letters Patent is:

1. In an incubator, a plurality of rows of egg trays, each of said rows being tiltable from an angle of inclination in one direction to an angle of inclination in the other direction, said rows being so closely disposed that striking would occur were said rows tilted simultaneously, and means for first initiating tilting of alternate of said rows to at least the horizontal but incompletely, then initiating tilting of the intermediate rows while completing tilting of said alternate rows, and then completing tilting of said intermediate rows.

2. In an incubator, a pair of adjacent rows of egg trays, each of said rows being tiltable from an angle of inclination in one direction to an angle of inclination in the opposite direction, said rows being so closely disposed that they would interfere with one another if tilted simultaneously, and means for successively tilting said rows comprising a reciprocatable control plate having a right angle control slot therein for each of said rows, and a member for each of said rows received in said slot and operatively connected to its row to control tilting thereof as said control plate is moved.

3. In an incubator, a pair of adjacent rows of egg trays, each of said rows being tiltable from an angle of inclination in one direction to an angle of inclination in the opposite direction, said rows being so closely disposed that they would interfere with one another if tilted simultaneously, means for successively tilting said rows comprising a reciprocatable control plate having a right angle control slot therein for each of said rows, a member for each of said rows received in said slot and operatively connected to its row to control tilting thereof as said control plate is moved, and means for reciprocating said control plate so as to tilt said rows from either of said angles to the other angle.

4. In an incubator, a pair of adjacent rows of egg trays, each of said rows being tiltable from an angle of inclination in one direction to an angle of inclination in the opposite direction, said rows being so closely disposed that they would strike one another if tilted simultaneously, means for non-simultaneously tilting said rows comprising a movable control plate extending across said rows and provided with a slot for each of said rows, said slot having a vertical portion and a horizontal portion, said vertical portions being disposed adjacent one another, a member carried by each of said rows adapted to tilt the same and received in and controlled by the slot for its row, and means for causing said member to enter the vertical portion of its slot when said control plate is moved towards the other row.

5. In an incubator tray tilting mechanism, a member operatively connected to tilt the tray, a control member provided with a control slot in which said first-named member is received, said slot having a vertical portion and a horizontal portion merging therewith at the bottom of said vertical portion, cam means fixedly attached to said first-named member, and means carried by said control member for cooperating with said cam means.

6. In an incubator tray tilting mechanism, a member operatively connected to tilt a tray, a movable control member provided with a slot in which said member is received, said slot having a vertical and a horizontal portion, said vertical and horizontal portions merging at the lower end of said vertical portion, cam means connected to said first-named member, means mounted on said control member for coacting with said cam member and having flat surfaces parallel to and adjacent the inside of said slot, said cam means and said last-named means cooperating to guide said first-named member in said slot as said control member is moved.

7. In an incubator tray tilting mechanism, a member operatively connected to tilt a tray, a movable control member having a slot in which said first-named member is received, said slot comprising a vertical portion and a horizontal portion merging therewith at the lower end of said vertical portion, a cam member fixedly attached to said first-named member, and means carried on said control member for cooperating with said cam member to cause said first-named member to initially move upwardly in said vertical portion of said slot when said control member is moved from the position where said first-named member is at the bottom of said vertical portion.

8. In an incubator tray tilting mechanism, a tray tilting member having a control pin on the end thereof, a reciprocatable control member having a control slot in which said pin is slidably received, said slot having a vertical portion adapted to move said pin during tilting, and a horizontal portion merging with the lower end of said vertical portion adapted to allow said control member to move relative to said pin after tilting has been effected, a cam member fixedly attached to the end of said tilting member and having a straight cam surface disposed at an angle such that when said pin is at the bottom of said vertical portion, said cam surface is parallel to said vertical portion, and means carried on said control member having a vertical surface parallel to said vertical portion for engaging with said cam member to cause said pin to enter said vertical portion when said pin is at the bottom of said vertical portion and said control member begins its movement.

9. In an incubator, a pair of adjacent tiltable egg trays, one of which would strike the other were they tilted simultaneously, a tilting member connected to each, and means for tilting said trays successively comprising a reciprocatable control member having a control slot for each tray, means attached to each tilting member and received in the slot for its tray, said slots being right angle slots having vertical tilting portions disposed adjacent each other and having horizontal portions extending outwardly therefrom for allowing said plate to slide without tilting one of said tilting members at the beginning and end of a reciprocating movement of said control member.

10. In an incubator, a pair of adjacent tiltable egg trays, one of which would strike the other if they were tilted simultaneously, a reciprocating control member for tilting said trays, and means associated therewith for initiating but only partially completing tilting of one of said trays while the other is stationary, for then initiating tilting of the other of said trays while continuing tilting of the first tray, and for allowing the first tray to remain stationary while continuing tilting of the other tray to its final position.

11. In an incubator, a pair of adjacent tiltable egg trays, one of which would strike the other if they were tilted simultaneously, a reciprocatable control member having a control slot for each of said trays, a member connected to each of said trays and received within the slot for its tray, said slot having a vertical portion adapted to receive and to move said last-named member and to thereby tilt the tray and having a horizontal portion adapted to slide over said member without moving it at the beginning of a tilting movement in one direction and to slide over said member without moving it at the end of a tilting movement in the opposite direction.

12. In an incubator tray turning mechanism, means operatively connected to turn alternate egg trays, means operatively connected to turn egg trays disposed between said alternate trays, a reciprocatable control member having a pair of slots therein, each of which receives an extension of one of said means, each of said slots comprising a horizontal portion and a vertical portion, said portions merging at the bottom of said vertical portion, said slots being disposed with said vertical portions adjacent each other, and cam means fixedly carried by each of said first and second-mentioned means and comprising a straight cam portion at an angle of 135° thereto and a curved cam portion adjacent said first and second-mentioned means, and means fixedly carried on said control member adjacent the inside angle of each of said slots for cooperatively engaging with each of said cam means and having a straight portion parallel to said vertical portion and a straight portion parallel to said horizontal portion, said last-named means serving to guide each of said extensions in its slot.

13. In an incubator, a series of rows of tiltable egg trays which are so closely disposed that they would strike one another if tilted simultaneously, and means for initiating tilting of but only partially tilting alternate of said rows while holding the intermediate rows stationary, thereafter initiating tilting of said intermediate rows while continuing tilting of said alternate rows to completion, and thereafter continuing tilting of said intermediate rows to completion while holding said alternate rows stationary.

CHARLES F. GEDGE.